(12) United States Patent
Zhao (10) Patent No.: US 10,396,405 B2
(45) Date of Patent: Aug. 27, 2019

(54) BUS BAR FOR A BATTERY CONNECTOR SYSTEM

(71) Applicant: TYCO ELECTRONICS CORPORATION, Berwyn, PA (US)

(72) Inventor: Weiping Zhao, Superior Township, MI (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 882 days.

(21) Appl. No.: 14/935,625

(22) Filed: Nov. 9, 2015

(65) Prior Publication Data
US 2016/0133908 A1   May 12, 2016

Related U.S. Application Data

(60) Provisional application No. 62/077,667, filed on Nov. 10, 2014.

(51) Int. Cl.
| | |
|---|---|
| *H01M 10/42* | (2006.01) |
| *H01M 2/20* | (2006.01) |
| *H01M 2/30* | (2006.01) |
| *H01M 10/48* | (2006.01) |

(52) U.S. Cl.
CPC ......... *H01M 10/425* (2013.01); *H01M 2/206* (2013.01); *H01M 2/30* (2013.01); *H01M 10/482* (2013.01); *H01M 2220/20* (2013.01)

(58) Field of Classification Search
CPC .................................................. H01M 10/425
See application file for complete search history.

(56) References Cited

U.S. PATENT DOCUMENTS

| | | | |
|---|---|---|---|
| 8,628,335 B1 | 1/2014 | Zhao | |
| 2009/0274956 A1* | 11/2009 | Kosugi | H01M 2/202 |
| | | | 429/158 |
| 2010/0266889 A1* | 10/2010 | Kim | H01M 2/0257 |
| | | | 429/158 |
| 2012/0121966 A1 | 5/2012 | Kim | |

(Continued)

FOREIGN PATENT DOCUMENTS

| | | |
|---|---|---|
| EP | 2 337 115 A2 | 6/2011 |
| EP | 2432048 A1 | 3/2012 |

(Continued)

OTHER PUBLICATIONS

International Search Report, International Application No. PCT/US2015/059818, International Filing Date, Nov. 10, 2015.

*Primary Examiner* — Sarah A. Slifka
*Assistant Examiner* — Brian R Ohara (57) ABSTRACT

A bus bar for electrically connecting adjacent battery cells of a battery module includes a base having a first leg and a second leg connected by a flexible joint. The flexible joint is folded-over such that the first leg is above the second leg. A first terminal tab extends from the first leg. The first terminal tab is configured to be terminated to a corresponding battery terminal of a first of the battery cells. A second terminal tab extends from the second leg. The second terminal tab is configured to be terminated to a corresponding battery terminal of a second of the battery cells. The first and second terminal tabs are arranged side-by-side with the first terminal tab being vertically positionable independent of the second terminal tab by the flexible joint.

21 Claims, 5 Drawing Sheets

(56) References Cited

U.S. PATENT DOCUMENTS

| | | |
|---|---|---|
| 2013/0089996 A1 | 4/2013 | Zhao |
| 2013/0196521 A1 | 8/2013 | Ogasawara et al. |
| 2014/0272520 A1* | 9/2014 | Kim ...................... H01M 2/202 |
| | | 429/121 |
| 2014/0356691 A1* | 12/2014 | Ahn ...................... H01M 2/305 |
| | | 429/158 |
| 2015/0064524 A1* | 3/2015 | Noh ...................... H01M 10/48 |
| | | 429/90 |

FOREIGN PATENT DOCUMENTS

| | | | |
|---|---|---|---|
| JP | H8307032 | A | 11/1996 |
| JP | 2001095130 | A | 4/2001 |
| JP | 2004119043 | A | 4/2004 |
| JP | 2010287568 | A | 12/2010 |
| JP | 2012 182043 | A | 9/2012 |
| JP | 2012243689 | A | 12/2012 |
| JP | 2013073929 | A | 4/2013 |
| WO | 2013 090649 | A1 | 6/2013 |
| WO | 2014 007474 | A1 | 1/2014 |
| WO | 2014073443 | A1 | 5/2014 |
| WO | 2014178114 | A1 | 6/2014 |

* cited by examiner

BUS BAR FOR A BATTERY CONNECTOR SYSTEM

CROSS-REFERENCE TO RELATED APPLICATIONS

This application claims the benefit of U.S. Provisional Application No. 62/077,667 filed Nov. 10, 2014, the subject matter of which is herein incorporated by reference in its entirety.

BACKGROUND OF THE INVENTION

The subject matter herein relates generally to flexible bus bars for battery connector systems.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. The positive and negative cell terminals are connected using bus bars. Typically, the positive and negative cell terminals typically include a threaded post or bolt. The bus bar is connected to the post using a nut. Such connections are time consuming, and may have other problems such as over or under torque, or cross threading. In other configurations, the problems with the threaded post or bolt is avoided by welding the bus bars to the cell terminals. However, problems arise in welding the bus bars to the cell terminals. For example, welding, such as with laser welding, requires good physical contact between the bus bar and the corresponding cell terminals. However, problems arise when the cell terminals are at different vertical positions due to manufacturing position tolerance stack up. Having rigid bus bars is problematic because when one side of the bus bar is pressed downward to press against the corresponding terminal, the other side of the bus bar may be lifted upward off of the corresponding cell terminal.

A need remains for battery modules that use low cost, flexible bus bars for termination of the bus bars to the cell terminals.

BRIEF DESCRIPTION OF THE INVENTION

In one embodiment, a bus bar is provided for electrically connecting adjacent battery cells of a battery module that includes a base having a first leg and a second leg connected by a flexible joint. The flexible joint is folded-over such that the first leg is above the second leg. A first terminal tab extends from the first leg. The first terminal tab is configured to be terminated to a corresponding battery terminal of a first of the battery cells. A second terminal tab extends from the second leg. The second terminal tab is configured to be terminated to a corresponding battery terminal of a second of the battery cells. The first and second terminal tabs are arranged side-by-side with the first terminal tab being vertically positionable independent of the second terminal tab by the flexible joint.

In a further embodiment, a battery connector system is provided for connecting battery cells of a battery module that includes a carrier assembly holding a circuit module and a plurality of bus bar assemblies held by the carrier assembly. Each bus bar assembly includes a bus bar for electrically connecting adjacent battery cells of the battery module. The bus bar includes a base having a first leg and a second leg connected by a flexible joint being folded-over such that the first leg is above the second leg. A first terminal tab extends from the first leg and is configured to be terminated to a corresponding battery terminal of a first of the battery cells. A second terminal tab extends from the second leg and is configured to be terminated to a corresponding battery terminal of a second of the battery cells. The first and second terminal tabs are arranged side-by-side with the first terminal tab being vertically positionable independent of the second terminal tab by the flexible joint. A voltage sensor extends from the bus bar. The voltage sensor senses a voltage of the bus bar. The voltage sensor is terminated to the circuit module.

DETAILED DESCRIPTION OF THE INVENTION

Figure 1:
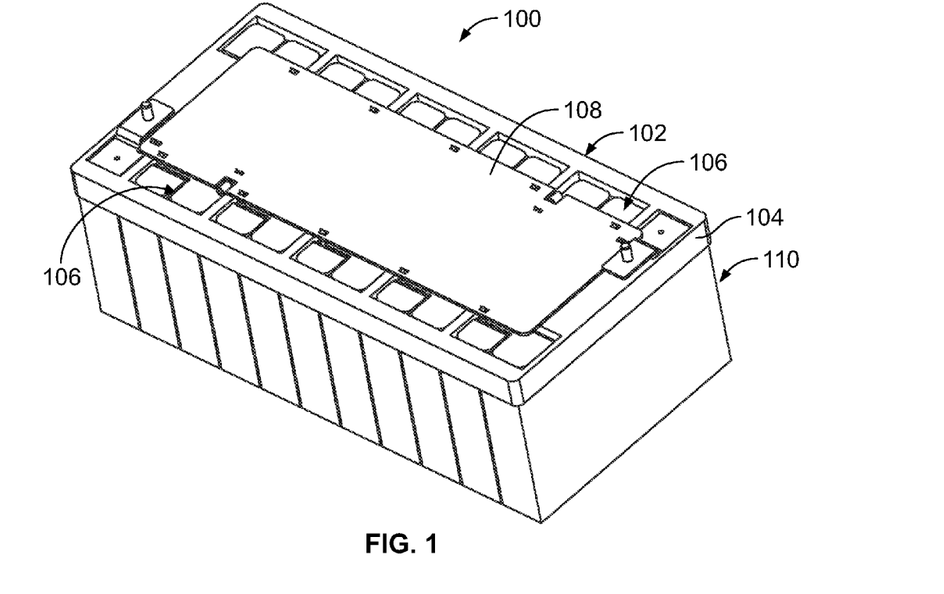
FIG. 1 is a top perspective view of a battery connector system formed in accordance with an exemplary embodiment.

FIG. 1 is a top perspective view of a battery connector system 100 formed in accordance with an exemplary embodiment. The battery connector system 100 includes a battery module 110 and a carrier assembly 102. The carrier assembly 102 includes one or more carrier housings 104 holding a plurality of bus bar assemblies 106. The bus bar assemblies 106 may be electrically connected to a circuit module 108, which may monitor the battery module 110 and/or control functions associated with the battery module 110.

Figure 2:
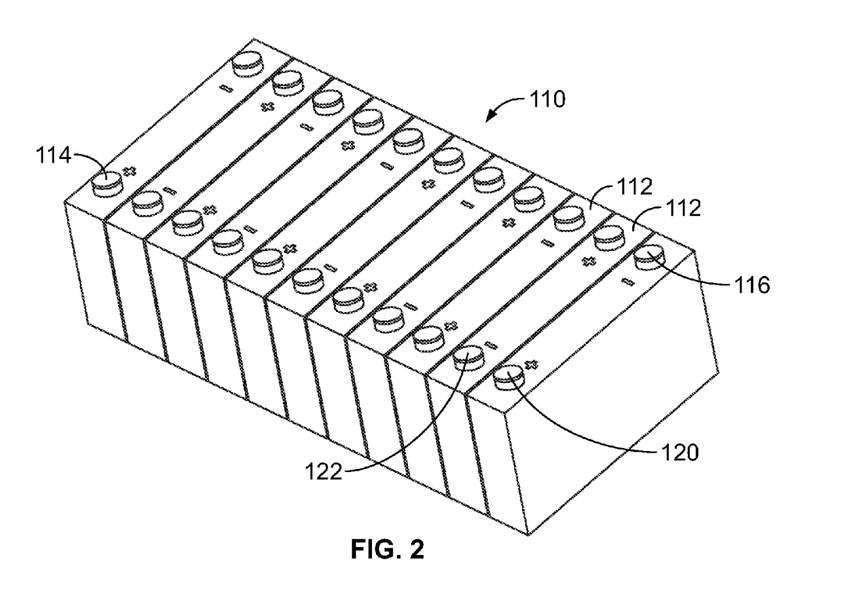
FIG. 2 is a top perspective view of a battery module of the battery connector system shown in FIG. 1.

FIG. 2 is a top perspective view of the battery module 110 with the carrier assembly 102 (shown in FIG. 1) removed to illustrate battery cells 112 of the battery module 110. The battery module 110 may be used as part of a battery system in a vehicle, such as an electric vehicle or a hybrid electrical vehicle. The battery module 110 may be used in other applications in alternative embodiments. Multiple battery modules 110 may be ganged together to form a battery pack assembly.

Each battery module 110 includes a plurality of battery cells 112, such as prismatic battery cells. The battery cells 112 are arranged in a stacked configuration, side-by-side, to form the battery module 110. Optional, the battery module 110 may include a case or other housing that holds the battery cells 112. A battery cover (not shown) may be provided over the tops of the battery cells 112 and the carrier assembly 102. The battery cover may cover each of the battery cells 112.

Each battery module 110 includes a positive battery terminal 114 and a negative battery terminal 116. The terminals 114, 116 are configured to be coupled to an external power cable or alternatively may be bussed to battery cell terminals of another battery module 110, such as using a module-to-module connector. Each battery cell 112 includes a positive battery cell terminal 120 and a negative battery cell terminal 122. In an exemplary embodiment, the positive cell terminal 120 is connected to an adjacent negative battery cell terminal 122 of an adjacent battery cell 112 by the corresponding bus bar assembly 106 (shown in FIG. 1). Likewise, the negative cell terminal 122 is connected to an adjacent positive battery cell terminal 120 of an adjacent battery cell 112 by the corresponding bus bar assembly 106. The cell terminals 120, 122 of the end battery cells 112 may define the battery terminals 114, 116.

Figure 3:
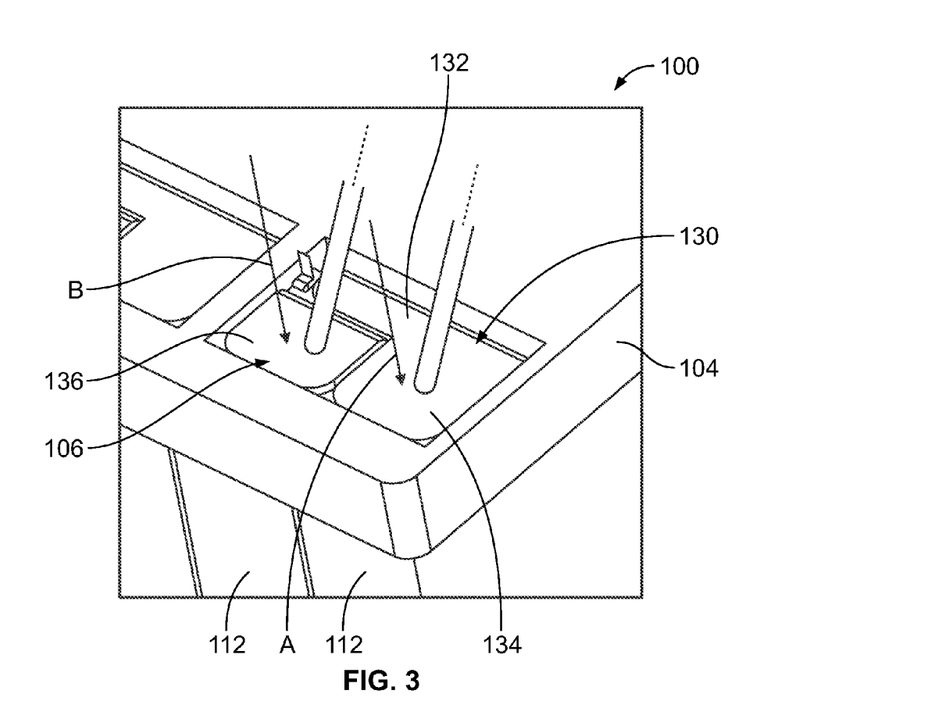
FIG. 3 is a top perspective view of a portion of the battery connector system showing a bus bar assembly terminated to battery cells of the battery module.

FIG. 3 is a top perspective view of a portion of the battery connector system 100 showing one of the bus bar assemblies 106 being terminated to the corresponding battery cells 112. The carrier housing 104 positions the bus bar assembly 106 relative to the battery cells 112, such as vertically above the positive and negative battery cell terminals 120, 122 (shown in FIG. 2). In an exemplary embodiment, the bus bar assembly 106 is welded to the battery cell terminals 120, 122. For example, the bus bar assembly 106 may be laser welded, ultrasonic welded, resistance welded, or other type of welding to the battery cell terminals 120, 122. The bus bar assembly 106 may be terminated by other processes or methods in alternative embodiments.

The bus bar assembly 106 includes a bus bar 130 having a base 132 with first and second terminal tabs 134, 136 extending therefrom. The first terminal tab 134 is configured to be terminated (such as laser welded) to one of the battery cell terminals, such as the positive battery cell terminal 120 and the second terminal tab 136 is configured to be terminated (such as laser welded) to the other battery cell terminal, such as the negative battery cell terminal 122. The terminal tabs 134, 136 are arranged side by side such that the terminal tabs 134, 136 are positioned over the corresponding battery cell terminals 120, 122. Optionally, the bus bar 130 and the battery cell terminals 120, 122 may be manufactured from the same or similar metals (e.g., with the bus bar 130 being aluminum and the battery cell terminals 120, 122 being aluminum or with the bus bar 130 being copper and the battery cell terminals 120, 122 being copper). Alternatively, the bus bar 130 and battery cell terminals 120, 122 may be manufactured from different metals (e.g., with the bus bar 130 being aluminum and the battery cell terminals 120, 122 being copper). Optionally, the bus bar 130 may be a bi-metal, such as, for example, a portion being aluminum (or aluminum alloy) and a portion being copper (or copper alloy).

During terminating such as laser welding, the first terminal tab 134 is pressed downward by a pressing force, shown by arrow A, and the second terminal tab 136 is pressed downward by a pressing force, shown by arrow B. The terminal tabs 134, 136 are pressed downward into physical contact with the battery cell terminals 120, 122 for laser welding thereto. To ensure good physical contact between the terminal tabs 134, 136 and the battery cell terminals 120, 122, in an exemplary embodiment, the terminal tabs 134, 136 are independently moveable with respect to each other. For example, the terminal tab 134 may be pressed downward against the battery cell terminal 120 independently of the terminal tab 136 being pressed downward against the battery cell terminal 122.

In an exemplary embodiment, the terminal tabs 134, 136 are vertically positionable independent of each other. As such, the first terminal tab 134 may be pushed downward further than the second terminal tab 136 or the second terminal tab 136 may be pushed downward further than the first terminal tab 134. As such, the terminal tabs 134, 136 can accommodate adjacent battery cells 112 with battery cell terminals 120, 122 at different vertical positions. For example, within the battery module 110, some of the battery cells 112 may be shifted or held at different orientations or positions. Additionally, the battery cells 112 may be manufactured at different tolerances such that the battery cell terminals 120, 122 may be non-coplanar. For effective terminating such as laser welding, both terminal tabs 134, 136 must be in intimate contact with the corresponding battery terminals 120, 122. Having the terminal tabs 134, 136 independently positionable allows proper positioning of the terminal tabs 134, 136 with respect to the battery cell terminals 120, 122. In an exemplary embodiment, the base 132 is flexible to allow independent movement of the terminal tabs 134, 136.

Figure 4:
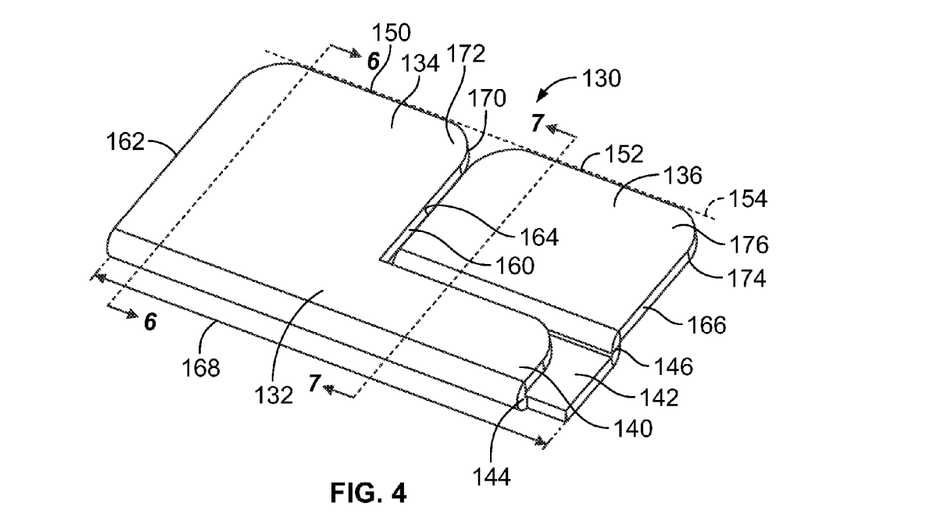
FIG. 4 is a top perspective view of the bus bar formed in accordance with an exemplary embodiment.

FIG. 4 is a top perspective view of the bus bar 130 formed in accordance with an exemplary embodiment. The base 132 is provided at a rear of the bus bar 130 while the terminal tabs 134, 136 are provided at a front of the bus bar 130. The base 132 has a first leg 140 and a second leg 142 connected by a flexible joint 144. The flexible joint 144 is folded over such that the first leg 140 is above the second leg 142. The first leg 140, second leg 142 and flexible joint 144 are integrally formed as a unitary structure. In an exemplary embodiment, the first and second terminal tabs 134, 136 are integrally formed as part of the unitary structure. In an exemplary embodiment, the flexible 144 joint is U-shaped between the first and second legs 140, 142. The first leg 140, second leg 142, and flexible joint 144 extend longitudinally behind and along both the first and second terminal tabs 134, 136. As such, the first terminal tab 134 is positioned forward of the first leg 140 and the flexible joint 144. The second terminal tab 136 is positioned forward of the first leg 140 and the flexible joint 144. The terminal tabs 134, 136 may be positioned forward of the second leg 142 in addition to, or in the alternative to, being positioned forward of the first leg 140.

In an exemplary embodiment, the second terminal tab 136 is bent upward to be coplanar with the first terminal tab 134. For example, the second terminal tab 136 may include a transition portion 146 that transitions from the second leg 142 upward to align the second terminal tab 136 along a common vertical plane with the first terminal tab 134. The transition portion 146 may include two 90° bends to position the second terminal tab 136 co-planar with the first terminal tab 134. In alternative embodiments, the first terminal tab 134 may include a transition portion in addition to, or in lieu of, the second terminal tab 136 having a transition portion.

The first terminal tab 134 extends forward from the first leg 140 to a front edge 150, which is opposite the flexible joint 144. The second terminal tab 136 extends from the second leg 142 forward to a front edge 152, which is opposite the flexible joint 144. In an exemplary embodiment, the front edges 150, 152 are generally aligned along a front axis 154, which extends generally parallel to the flexible joint 144.

The first terminal tab 134 has an inner side 160 and an outer side 162 opposite the inner side 160. The inner and outer sides 160, 162 extend from the first leg 140 to the front edge 150. The inner and outer sides 160, 162 may be linear. The inner and outer sides 160, 162 may be generally perpendicular to the front edge 150.

The second terminal tab 136 includes an inner side 164 and an outer side 166 opposite the inner side 164. The inner and outer side 164, 166 extend from the second leg 142 to the front edge 152. The inner and outer sides 164, 166 may be linear. The inner and outer sides 164, 166 may be generally perpendicular to the front edge 152.

In an exemplary embodiment, the terminal tabs 134, 136 are arranged side by side such that the inner sides 160, 164 are positioned adjacent each other and face each other. The outer side 162, 162 face away from each other. The first terminal tab 134 extends width wise along the front edge 150 between the inner side 160 and the outer side 162. Similarly, the second terminal tab 136 extends width wise along the front edge 152 between the inner side 164 and the outer side 166. The base 132 extend width wise behind the first and second terminal tabs 134, 136 and has a width 168 at least as wide as a combined width of the first and second terminal tabs 134, 136. For example, a slight gap may be defined between the first and second terminal tabs 134, 136.

The first terminal tab 134 has an inner surface 170 configured to face the battery cell terminal 120 (shown in FIG. 2) and an outer surface 172 opposite the inner surface 170. The second terminal tab 136 has an inner surface 174 configured to face the battery cell terminal 122 (shown in FIG. 2) and an outer surface 176 opposite the inner surface 174. In an exemplary embodiment, the inner surfaces 170, 174 are generally coplanar, such as in a resting position; however, when the first and second terminal tabs 134, 136 are pushed against the battery cell terminals 120, 122, the inner surfaces 170, 174 are capable of being non-coplanar to accommodate variation in height of the battery cell terminals 120, 122. For example, the terminal tabs 134, 136 may be deflectable from resting positions to deflected positions.

The bus bar 130 may be stamped and formed into a particular shape defining the resting position. In the resting position, the inner surface 170, 174 may be generally coplanar. However, once the terminal tabs 134, 136 are pressed downward against the battery cell terminals 120, 122 to the deflected position, the terminal tabs 134, 136 may no longer be coplanar.

Figures 5, 6, 7:
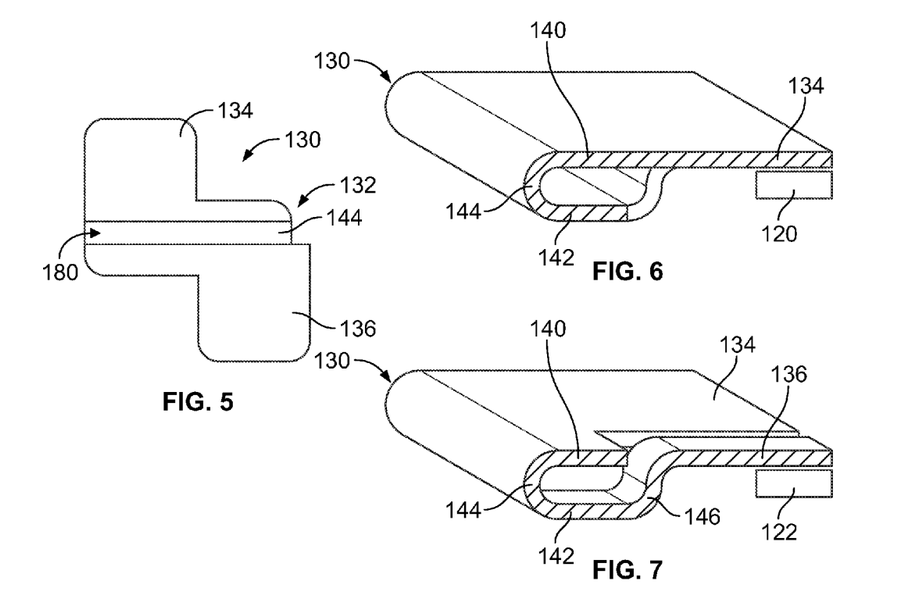
FIG. 5 shows the bus bar during manufacture.
FIG. 6 is a cross sectional view of a portion of the bus bar taken along line 6-6 in FIG. 4.
FIG. 7 is a cross sectional view of a portion of the bus bar taken along line 7-7 in FIG. 4.

FIG. 5 shows the bus bar 130 after being stamped, but prior to being formed into the final shape. When stamped, the first and second terminal tabs 134, 136 are on opposite sides of the base 132. However, after the flexible joint 144 is formed, such as by rolling or folding a portion of the base 132, the first and second terminal tabs 134, 136 are then positioned on the same side of the base 132 (see, for example, FIG. 3).

The area of the base 132 defining the flexible joint 144 is identified in FIG. 5 as area 180. Such area 180 may be thinned prior to forming the bus bar 130. For example, the area 180 may be indented or pressed to thin the area 180. The area 180 may be stretched to thin the area 180. Material from the area 180 may be removed to thin the area 180. By thinning the area 180, the flexible joint 144 may be made more flexible. Alternative, such area 180 may not be thinned prior to forming the bus bar 130.

FIG. 6 is a cross sectional view of a portion of the bus bar 130 taken along line 6-6 in FIG. 4. FIG. 7 is a cross sectional view of a portion of the bus bar 130 taken along line 7-7 in FIG. 4. FIGS. 6 and 7 illustrate the terminal tabs 134, 136 terminated to corresponding battery cell terminals 120, 122, respectively. The terminal tabs 134, 136 are generally coplanar. The flexible joint 144 positions the first leg 140 above the second leg 142. The transition portion 146 transitions the second terminal tab 136 from the second leg 142 upward to the same vertical height as the first terminal tab 134.

Figure 8:
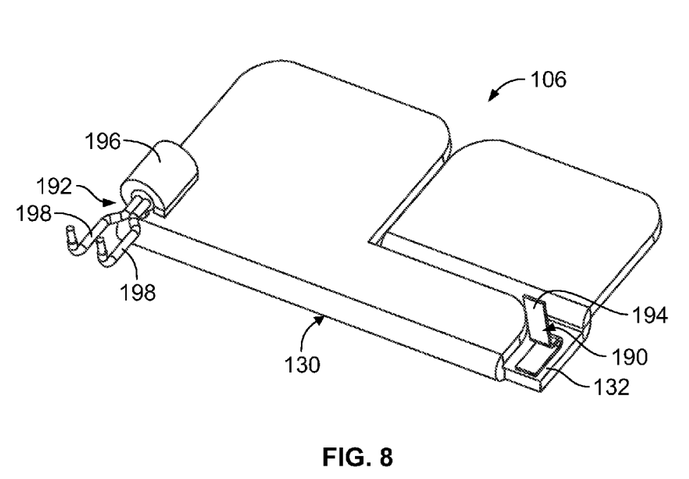
FIG. 8 is a top perspective view of a bus bar assembly in accordance with an exemplary embodiment.

FIG. 8 is a top perspective view of the bus bar assembly 106 in accordance with an exemplary embodiment. The bus bar assembly 106 includes the bus bar 130, a voltage sensor 190 coupled to the bus bar 130 and a thermistor 192 coupled to the bus bar 130.

The voltage sensor 190 provides sensing, such as voltage sensing, of the corresponding battery cells 112, such as to a centralized battery management system. The voltage sensor 190 is electrically connected to the corresponding bus bar 130, such as by welding the voltage sensor 190 to the base 132. The voltage sensor 190 may be terminated by other processes or methods in alternative embodiments, such as crimping, soldering, an insulation displacement connection, quick connection, wiring, and the like. The voltage sensor 190 includes a terminating end 194, which may be terminated to the circuit module 108 (shown in FIG. 1). For example, the terminating end 194 may be a pin configured to be press-fit to a circuit board of the circuit module 108. The terminating end 194 may be a pin, tail, beam or other structure configured to be soldered to a circuit board of the circuit module 108. The terminating end 194 may be soldered, crimped or otherwise terminated to a wire of the circuit module 108, such as by an insulation displacement connection. The terminating end 194 may be a terminal, which may be snapped to the bus bar 130. The terminating end 194 may be a wire, which may be directly terminated to the bus bar 130.

The thermistor 192 provides sensing, such as temperature sensing, of the bus bar 130 which represents the cell temperature. In an exemplary embodiment, the bus bar 130 includes a tab extending therefrom, such as from the first leg 140, that is formed into a barrel 196. The thermistor 192 includes one or more wires 198 received in the barrel 196. The thermistor 192 may include a temperature sensor connected to the wire(s) 198. The wires 198 and/or temperature sensor may be buried inside the barrel 196 in thermal contact with the barrel 196, such as by potting thermal conductive material inside the barrel 196. The barrel 196 defines a container of the thermistor 192 and potting material. In other alternative embodiments, the barrel 196 may be crimped to the wires 198. The wires 198 include terminating ends, which may be terminated to the circuit module 108. For example, the wires 198 may be press-fit to a circuit board of the circuit module 108. The wires 198 may be soldered to a circuit board of the circuit module 108. The wires 198 may be soldered, crimped or otherwise terminated to a wire of the circuit module 108 (see FIG. 9).

Figure 9:
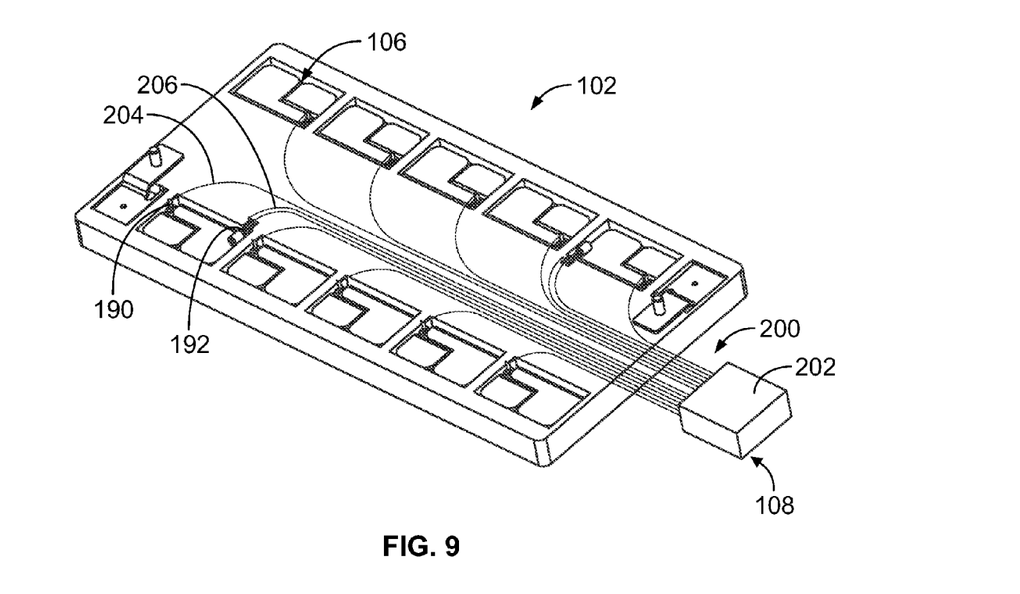
FIG. 9 is a top perspective view of a carrier assembly with an integrated thermistor of the battery connector system in accordance with an exemplary embodiment.

FIG. 9 is a top perspective view of the carrier assembly 102 in accordance with an exemplary embodiment. The carrier assembly 102 is shown holding a plurality of the bus bar assemblies 106. In the illustrated embodiment, the carrier assembly 102 includes a circuit module 208 that includes a wire harness 200 and a connector 202, as opposed to the circuit module 108 shown in FIG. 1 that includes a circuit board. The connector 202 may be positioned remote from the carrier assembly 102, such as at a central battery management system. Alternatively, the connector 202 may be held by the carrier housing 104.

The wire harness 200 includes a plurality of wires 204 connected to corresponding voltage sensing leads 190. The wire harness 200 includes a plurality of wires 206 connected to corresponding thermistors 192. In an exemplary embodiment, each bus bar assembly 106 includes a corresponding voltage sensing lead 190 while only a few of the bus bars assemblies 106 include thermistors 192.

Figure 10:
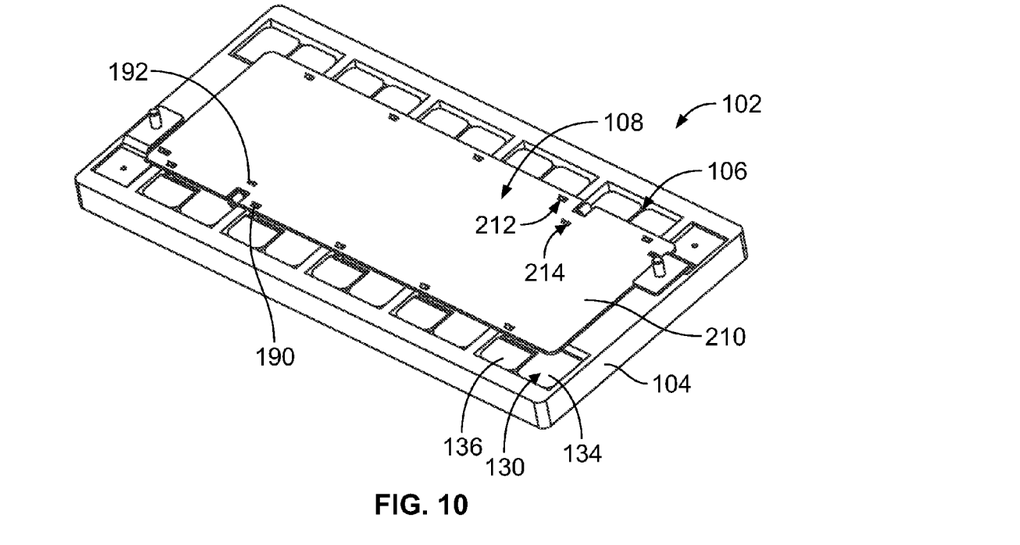
FIG. 10 is a top perspective view of the carrier assembly of the battery connector system in accordance with an exemplary embodiment.

FIG. 10 is a top perspective view of the carrier assembly 102 in accordance with an exemplary embodiment. The carrier assembly 102 is shown holding a plurality of the bus bar assemblies 106. The carrier assembly 102 may be flexible to accommodate flexing or movement of the bus bars 130 during welding of the bus bars 130 to the battery cell terminals 120, 122. For example, portions of the carrier housing 104 may be split to allow movement. In alternative embodiments, the pockets in the carrier housing 104 that hold the bus bars 130 may hold the bus bars 130 in a manner that allows independent movement of the terminal tabs 134, 136. In the illustrated embodiment, the circuit module 108 includes a circuit board 210. The circuit board 210 is arranged along a top of the carrier housing 104. Electrical components may be provided on the circuit board 210 and electrically connected to corresponding voltage sensors 190 and/or thermistors 192.

The circuit board 210 includes a plurality of vias 212 receiving corresponding voltage sensing leads 190. The voltage sensing leads 190 may be soldered in the vias 212. The circuit board 210 includes a plurality of vias 214 connected to corresponding thermistors 192. The thermistors 192 may be soldered in the vias 214. In an exemplary embodiment, each bus bar 130 includes a corresponding voltage sensing lead 190 while only a few of the bus bars 130 include thermistors 192. The circuit board 210 may be a printed circuit board, a flexible printed circuit board, a flexible flat cable, or another type of substrate.

Figure 11:
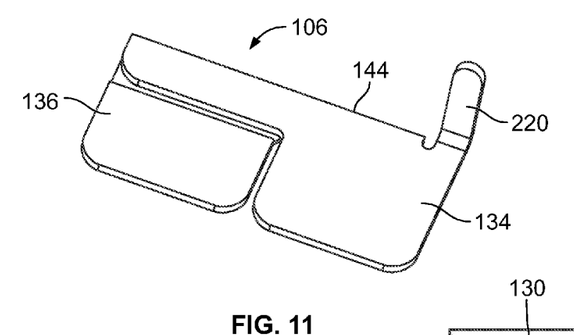
FIG. 11 is a top perspective view of the bus bar assembly in accordance with an exemplary embodiment.

FIG. 11 is a top perspective view of the bus bar assembly 106 in accordance with an exemplary embodiment having an integral voltage sensor 220, as opposed to a separate voltage sensor as in the embodiment shown in FIG. 8. The bus bar assembly 106 may be a bimetal bus bar (e.g. Cu—Al bi-metal), such as a bus bar having an aluminum terminal tab 134 and a copper terminal tab 136. The voltage sensor 220 may contain the same material as the corresponding terminal tab, such as a copper material or an aluminum material. In the illustrated embodiment, the voltage sensor 220 extends from the terminal tab 134, such as at or near the flexible joint 144; however the voltage sensor 220 may be provided at any location along the bus bar 130. The voltage sensor 220 may be stamped and formed with the bus bar 130, such as being folded at one or more bend lines to be upstanding from the terminal tab 134.

Figure 12:
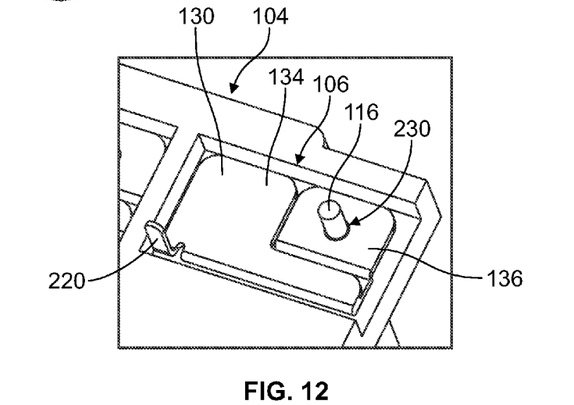
FIG. 12 is a top perspective view of the bus bar assembly in accordance with an exemplary embodiment.

FIG. 12 is a top perspective view of the bus bar assembly 106 having the integral voltage sensor 220 in the carrier housing 104. The bus bar 130 includes an opening 230 in the terminal tab 136 that receives the corresponding battery terminal 116 (the opening 230 may be provided in the terminal tab 134 for receiving the battery terminal 114 in other various embodiments). The bus bar assembly 106 may be a bimetal bus bar.

Figure 13:
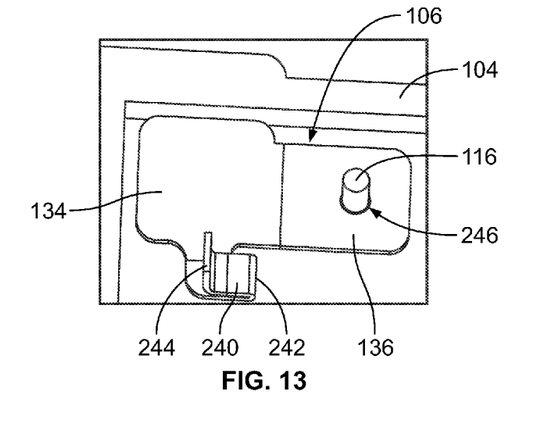
FIG. 13 is a top perspective view of the bus bar assembly in accordance with an exemplary embodiment.

FIG. 13 is a top perspective view of the bus bar assembly 106 having an integral voltage sensor 240 in the carrier housing 104. In the illustrated embodiment, the terminal tabs 134, 136 are flat or planar and do not include a flexible joint therebetween; however the voltage sensor 240 includes a flexible joint 242 to allow floating engagement of a terminating end 244 to the circuit module 108 (shown in FIG. 1). The terminal tab 136 includes an opening 246 that receives the corresponding battery terminal 116. The voltage sensor 240 may be a bimetal voltage sensor. The voltage sensor 240 may be bent into a desire 3-dimensional shape being flexible and movable, such as up-and-down and/or side-to-side for aligning to the circuit module 108.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A bus bar for electrically connecting adjacent first and second battery cells of a battery module comprising:
   a base having a first leg and a second leg connected by a flexible joint, the flexible joint being folded-over such that the first leg is above the second leg, the first leg, the second leg, and the flexible joint each arranged to span across the first and second battery cells;
   a first terminal tab extending from the first leg, the first terminal tab being configured to be terminated to a corresponding battery cell terminal of the first battery cell;
   a second terminal tab extending from the second leg, the second terminal tab being configured to be terminated to a corresponding battery cell terminal of the second battery cell;
   wherein the first and second terminal tabs are arranged side-by-side, the first terminal tab being vertically positionable independent of the second terminal tab by the flexible joint; and
   wherein the first terminal tab has an inner surface configured to face the battery terminal of the first battery cell and an outer surface opposite the inner surface, the second terminal tab having an inner surface configured to face the battery terminal of the second battery cell and an outer surface opposite the inner surface, the inner surfaces being generally coplanar, the outer surfaces being generally coplanar.

2. The bus bar of claim 1, wherein the flexible joint is thinner than the first and second tabs.

3. The bus bar of claim 1, wherein the first leg, second leg, and the flexible joint are integrally formed as a unitary structure.

4. The bus bar of claim 1, wherein the first and second terminal tabs are generally coplanar but independently moveable relative to each other.

5. The bus bar of claim 1, wherein the flexible joint is U-shaped.

6. The bus bar of claim 1, wherein the first leg extends longitudinally along the first terminal tab and the second terminal tab.

7. The bus bar of claim 1, wherein the first terminal tab is configured to be pressed against the battery terminal of the first battery cell for laser welding thereto and the second terminal tab is configured to be pressed against the battery terminal of the second battery cell for laser welding thereto independent of the first terminal tab.

8. The bus bar of claim 1, wherein the first terminal tab has a front edge opposite the flexible joint, the second terminal tab has a front edge opposite the flexible joint, the front edge of the first terminal tab being generally aligned with the front edge of the second terminal tab.

9. The bus bar of claim 1, wherein the first terminal tab has an inner side and an outer side, the second terminal tab having an inner side and an outer side, the inner sides positioned adjacent each other and facing each other, the outer sides facing away from each other.

10. The bus bar of claim 9, wherein the first terminal tab and second terminal tab extend width-wise between the corresponding inner and outer sides, the base having a width greater than a combined width of the first and second terminal tabs.

11. The bus bar of claim 1, wherein the first terminal tab is deflectable from a resting position to a deflected position where the inner surface of the first terminal tab is pressed against the battery terminal of the first battery cell in the deflected position, the second terminal tab being deflectable from a resting position to a deflected position where the inner surface of the second terminal tab is pressed against the battery terminal of the second battery cell in the deflected position, in the resting positions the inner surfaces are generally coplanar, in the deflected positions the inner surfaces are capable of being non-coplanar.

12. The bus bar of claim 1, further comprising a voltage sensor extending from the base for sensing a voltage of the bus bar.

13. The bus bar of claim 1, further comprising a thermistor coupled to the base for sensing a temperature of the bus bar.

14. The bus bar of claim 1, wherein the first terminal tab is copper and the second terminal tab is aluminum.

15. A battery connector system for connecting first and second battery cells of a battery module comprising:

a carrier assembly holding a circuit module; and a plurality of bus bar assemblies held by the carrier assembly, each bus bar assembly comprising:

a bus bar for electrically connecting the adjacent first and second battery cells of the battery module, the bus bar comprising a base having a first leg and a second leg connected by a flexible joint being folded-over such that the first leg is above the second leg, the base having a front and a rear, the flexible joint provided at the rear, the first leg, the second leg, and the flexible joint arranged to each span across the first and second battery cells, a first terminal tab extending from the first leg being configured to be terminated to a corresponding battery terminal of the first battery cell, and a second terminal tab extending from the second leg being configured to be terminated to a corresponding battery terminal of the second battery cell, the first terminal tab extending from the first leg at the front, the second terminal tab extending from the second leg at the front, wherein the first and second terminal tabs are arranged side-by-side, the first terminal tab being vertically positionable independent of the second terminal tab by the flexible joint; and a voltage sensor extending from the bus bar, the voltage sensor sensing a voltage of the bus bar, the voltage sensor being terminated to the circuit module.

16. The battery connector system of claim 15, wherein the voltage sensor is welded to the base of the bus bar.

17. The battery connector system of claim 15, wherein the voltage sensor includes a terminating end, the circuit module comprising a circuit board, the terminating end being terminated to the circuit board.

18. The battery connector system of claim 15, wherein the voltage sensor includes a terminating end, the circuit module comprising a wire harness, the terminating end being terminated to a corresponding wire of the wire harness.

19. The battery connector system of claim 15, wherein the voltage sensor is integral with bus bar.

20. The battery connector system of claim 15, wherein the first terminal tab has an inner surface configured to face the battery terminal of the first battery cell and an outer surface opposite the inner surface, the second terminal tab having an inner surface configured to face the battery terminal of the second battery cell and an outer surface opposite the inner surface, the inner surfaces being generally coplanar, the outer surfaces being generally coplanar.

21. The bus bar of claim 1, wherein the base includes a front and a rear, the flexible joint provided at the rear, the first terminal tab extending from the first leg at the front, the second terminal tab extending from the second leg at the front.

* * * * *